(12) United States Patent
Hamm et al.

(10) Patent No.: US 10,016,830 B2
(45) Date of Patent: Jul. 10, 2018

(54) SUPPORT SYSTEM FOR TOOLS

(71) Applicants: James E. Hamm, Grafton, OH (US); Harald Krondorfer, Aurora, OH (US)

(72) Inventors: James E. Hamm, Grafton, OH (US); Harald Krondorfer, Aurora, OH (US)

(73) Assignee: Ridge Tool Company, Elyria, OH (US)

( * ) Notice: Subject to any disclaimer, the term of this patent is extended or adjusted under 35 U.S.C. 154(b) by 155 days.

(21) Appl. No.: 14/994,227

(22) Filed: Jan. 13, 2016

(65) Prior Publication Data

US 2017/0197265 A1 Jul. 13, 2017

(51) Int. Cl.
*B23G 1/24* (2006.01)
*B60R 11/06* (2006.01)
*B23G 1/52* (2006.01)
*B60R 11/00* (2006.01)

(52) U.S. Cl.
CPC ............ *B23G 1/24* (2013.01); *B23G 1/52* (2013.01); *B60R 11/06* (2013.01); *B60R 2011/004* (2013.01)

(58) Field of Classification Search
CPC .... B23G 1/24; B23G 1/46; B23G 1/52; B60R 11/06; B60R 2011/004
See application file for complete search history.

(56) References Cited

U.S. PATENT DOCUMENTS

| | | | |
|---|---|---|---|
| 1,344,280 A | 6/1920 | Vosper | |
| 1,749,861 A | 3/1930 | Vosper | |
| 2,887,886 A | 5/1959 | Chasar et al. | |
| 4,209,274 A | 6/1980 | Martin et al. | |
| 4,426,178 A | 1/1984 | Wuchner | |
| 4,642,002 A | 2/1987 | Wagner | |
| 4,705,254 A | 11/1987 | Swanson | |
| 5,082,037 A | 1/1992 | Hammons et al. | |
| 5,261,301 A | 11/1993 | Babb et al. | |
| 5,267,748 A | 12/1993 | Curran | |
| 6,511,088 B2 | 1/2003 | Kahlstorf | |
| 7,240,707 B1 | 7/2007 | Schweitzer | |
| 8,814,209 B1 | 8/2014 | Way | |
| 9,707,665 B1 * | 7/2017 | Smith | B25B 1/02 |
| 2010/0019122 A1 | 1/2010 | Barrett et al. | |
| 2010/0072240 A1 | 3/2010 | Cornes | |
| 2010/0269649 A1 * | 10/2010 | Rantz | B23G 1/24 82/113 |
| 2013/0127104 A1 | 5/2013 | Onello et al. | |

* cited by examiner

*Primary Examiner* — Alan Snyder
(74) *Attorney, Agent, or Firm* — Mark E. Bandy; Rankin, Hill & Clark LLP

(57) ABSTRACT

A support system for use with one or more tools such as a handheld power drive and a geared threader is described. The support system includes a lower frame portion for contacting a work surface or floor, a mast assembly, releasable engagement provisions between the lower frame portion and the mast assembly, and mounting provisions on the mast for supporting one or more tools. The support system is configurable between a stand alone mode and a vehicle hitch mode.

14 Claims, 11 Drawing Sheets

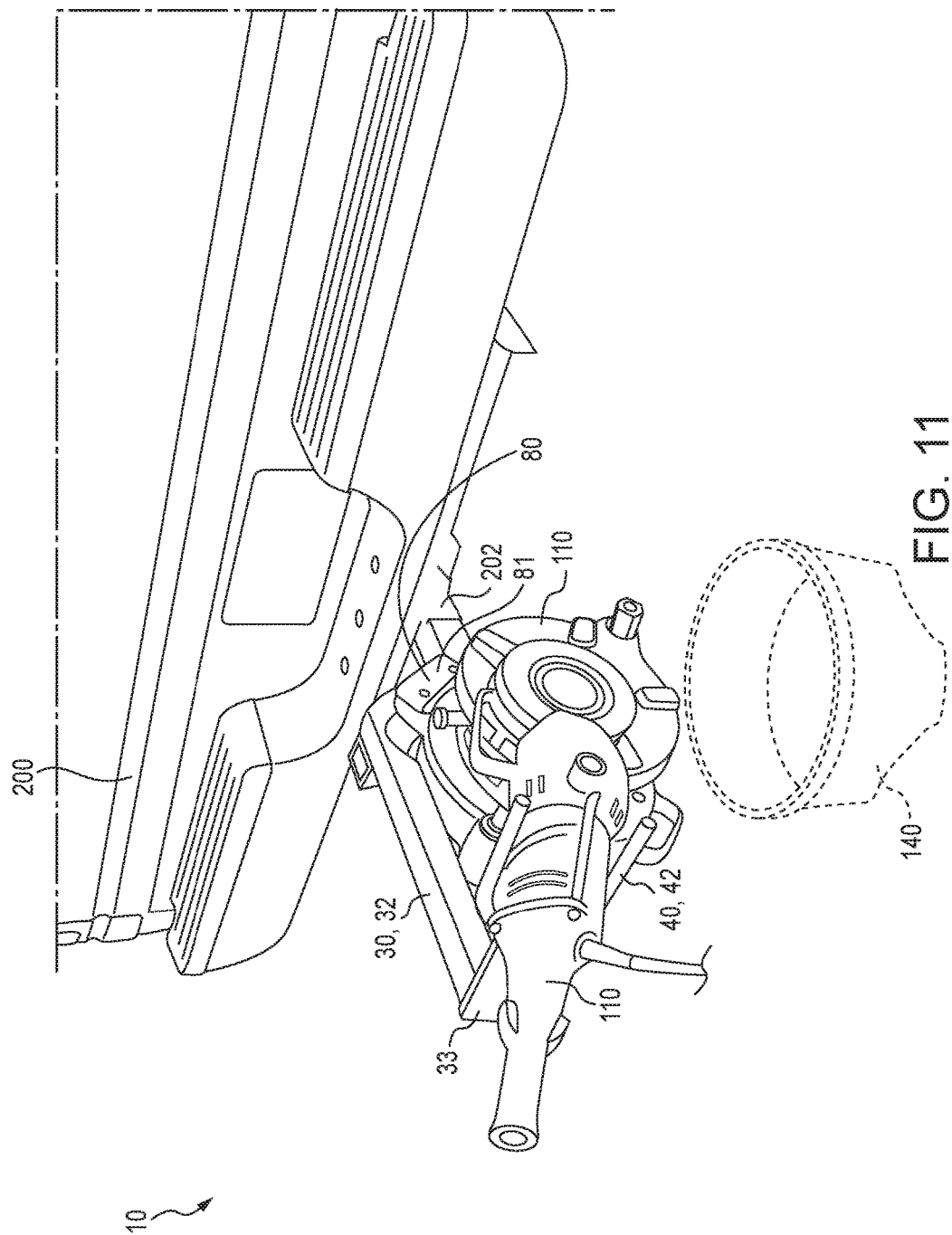

SUPPORT SYSTEM FOR TOOLS

FIELD

The present subject matter relates to support systems for tools and particularly a handheld powered drive and a geared threader. The present subject matter also relates to methods of forming threads on a workpiece using the support systems.

BACKGROUND

Workpieces such as pipes and conduits are typically subjected to one or more operations in which threads are formed on end(s) of the workpiece. A variety of devices are known for forming such threads.

For applications in which thread forming is performed in the field or at a remote location for example, it may not be possible or desirable to transport a heavy and/or large threading machine to the field or remote location. Therefore, portable threaders have been developed or known threaders have been adapted so as to be more readily transported and/or used in the field. For example, the RIDGID® Model 1224 Threading Machine can be supported on a rolling stand. However, that threading machine weighs in excess of 500 pounds. Although transportable, the resulting assembly may still require assistance in moving. Thus, for certain applications, users may desire still other equipment that can be more easily transported and particularly by a single user.

Thus, handheld powered drives have been developed which can be coupled with a threader or "geared threader" as sometimes referred to in the art. These components can be more readily transported by a single user. A representative assembly of these components is a RIDGID® Model 700 Power Drive coupled with a geared threader such as RIDGID® Models 141 or 161.

For a threading machine such as the previously noted 1224 machine, the reaction torque (or force path) is reacted internal to the machine. Using a handheld power drive without a reaction arm, the reaction torque (or force path) is external to the equipment and includes the user and the pipe stand and surroundings. Thus, for certain transportable devices reaction torque may be a concern and particularly when forming threads on larger workpieces such as for example pipes having a diameter of two (2) inches or more. Therefore, artisans have developed brackets or support arms that counter reaction torque when using handheld power drives with drop head dies and non-handheld power drives with geared threaders.

Although handheld powered drives and geared threaders provide a wide array of benefits, it will be appreciated that their repeated use requires continual exertion by an operator. In addition, it may be necessary to obtain, assemble, and incorporate brackets or support arms for countering reaction torque. Thus, it would be beneficial to provide a system for stably supporting such components and maintaining their relative positions during use, while also countering any reaction torque that may result from a thread forming operation. It would be particularly beneficial to provide such a system which required minimal or no assembly.

Tool supports that engage vehicle hitch receivers are known in the art. Vehicle hitch receivers generally include a receiver tube mounted to a vehicle typically under a bumper. The receiver tube is sized and shaped to receive a removable tow bar or hitch component that is inserted within the hitch receiver and secured thereto, often by a large removable pin. Many receiver tubes have a square shaped cross section which generally corresponds to the size and shape of the tow bar to be inserted therein.

Known hitch mounted tool supports are typically in the form of vises, work support plates, or tool platforms that incorporate a bar which is inserted into a receiver tube of a vehicle hitch receiver. Once engaged with the hitch receiver, the tool support provides a generally stable point for using a vise or other tool. Although satisfactory in certain aspects, known hitch mounted tool supports can not be readily used with systems of geared threaders and power drives. Such systems include multiple components and when used, require selective positioning, stable securement of the components and countering of reaction torque during use. Known tool supports which merely provide vises, work support plates, and tool platforms can not satisfy these particular requirements. Accordingly, a need exists for a hitch mounted tool support system which can be used in association with systems of geared threaders and power drives.

SUMMARY

The difficulties and drawbacks associated with previous approaches are addressed in the present subject matter as follows.

In one aspect, the present subject matter provides a tool support system comprising a lower frame portion for contacting a work surface or floor. The support system also comprises a mast assembly. The support system additionally comprises releasable engagement provisions between the lower frame portion and the mast assembly. And, the support system also comprises mounting provisions on the mast assembly for supporting one or more tools. The support system is configurable between (i) a stand alone mode in which the mast assembly is engaged with the lower frame portion and (ii) a vehicle hitch mode in which the mast assembly is disengaged and separate from the lower frame portion, such as for example when mounted on a vehicle.

In another aspect, the present subject matter provides a method of supporting at least one tool comprising providing a tool support system including (i) a lower frame portion for contacting a work surface or floor, (ii) a mast assembly, (iii) releasable engagement provisions between the lower frame portion and the mast assembly, and (iv) mounting provisions on the mast assembly. The method also comprises placing the tool support system in a stand alone mode by engaging the mast assembly with the lower frame portion by use of the releasable engagement provisions between the lower portion and the mast assembly. And, the method further comprises securing a tool to the mounting provisions on the mast assembly to thereby support the tool.

In still another aspect, the present subject matter provides a method of supporting at least one tool comprising providing a tool support system including (i) a lower frame portion for contacting a work surface or floor, (ii) a mast assembly, (iii) releasable engagement provisions between the lower frame portion and the mast assembly, and (iv) mounting provisions on the mast assembly. The method also comprises providing a vehicle hitch receiver. The method additionally comprises placing the tool support system in a vehicle hitch mode by disengaging and separating the mast assembly from the lower frame portion. The method further comprises engaging the mast assembly with the vehicle hitch receiver. And, the method also comprises securing a tool to the mounting provisions on the mast assembly to thereby support the tool.

In yet another aspect, the present subject matter provides a method for performing powered cutting of a pipe using a handheld manually displaceable pipe cutter. The method comprises providing a tool support system that includes (i) a lower frame portion for contacting a work surface or floor, (ii) a mast assembly, (iii) releasable engagement provisions between the lower frame portion and the mast assembly, and (iv) mounting provisions on the mast assembly for supporting one or more tools. The method also comprises securing a threader to the mounting provisions on the mast assembly to support the threader. The method also comprises positioning a pipe to be cut in the threader. The method further comprises providing a handheld manually displaceable pipe cutter having at least one cutting wheel and an outwardly extending handle or member. The method also comprises engaging the pipe cutter to the pipe. And, the method comprises rotating the pipe using the threader while manually displacing the cutting wheel into the pipe.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIGS. 9-11 illustrate the tool support system of FIGS. 1-5 in a vehicle hitch mode and including a docking member affixed to the mast assembly in accordance with the present subject matter.

DETAILED DESCRIPTION OF THE EMBODIMENTS

Figure 1:
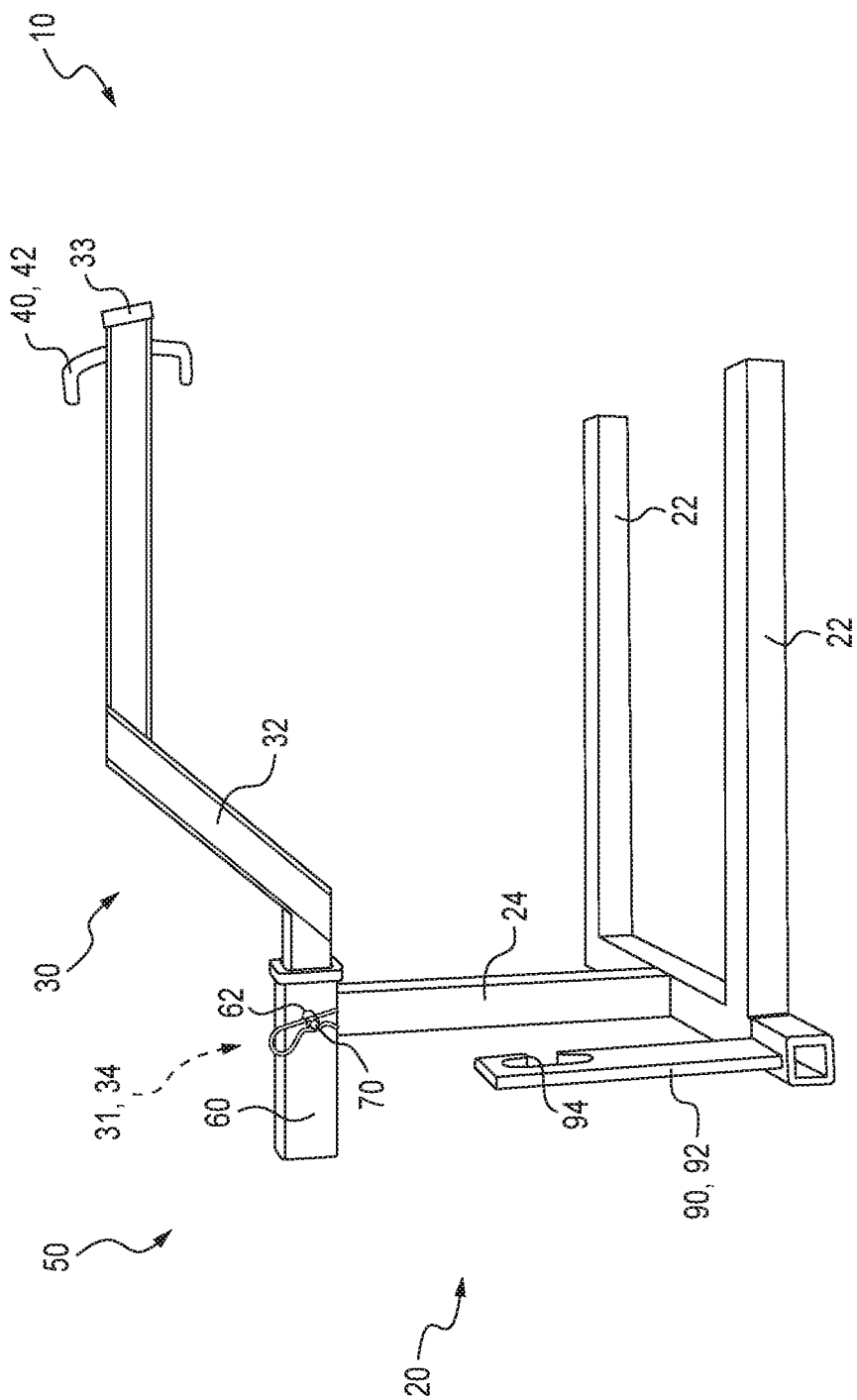
FIG. 1 is a view illustrating a first side of an embodiment of a tool support system in accordance with the present subject matter.

Generally, the present subject matter provides a support system for tools and particularly for a handheld powered drive and a geared threader. The support system generally comprises a lower frame portion for contacting a work surface or floor, a mast assembly that is releasably engageable with the lower frame portion, and mounting provisions on the mast assembly for supporting one or more tools such as for example a handheld power drive and a geared threader. When used with a handheld power drive and a geared threader, the support system maintains the power drive and geared threader in a desired orientation with a pipe or workpiece. The support system is readily configurable between a "stand alone" mode and a "vehicle hitch" mode. In the stand alone mode, the mast assembly is engaged with the lower frame portion. The lower frame portion contacts a work surface or floor and stably supports the mast assembly engaged therewith. In the stand alone mode, the support system is free standing and free of external anchoring provisions. In the vehicle hitch mode, the mast assembly is disengaged and separated from the lower frame portion for subsequent engagement with, and support by, a vehicle hitch receiver.

In many embodiments, the present subject matter provides a support system which enables rotational movement of a workpiece during a thread forming operation, and which also "internalizes" all reaction torque generated during the thread forming operation. In particular embodiments, the support system is adapted for use with a RIDGID® Model 700 Power Drive and a geared threader such as RIDGID® Models 141 or 161 geared threaders. However, it will be understood that the present subject matter is not limited to use with the Model 700 Power Drive and/or the Models 141 or 161 geared threaders. Instead, the present subject matter can be used with nearly any power drive configured to be portable and handheld, and/or with any threader used for forming threads in a workpiece. Another benefit of the present subject matter is that the bracket configuration described and depicted in greater detail herein, allows both the Models 141 and 161 geared threaders to be used without any adjustments. The bracket configuration enables these geared threaders to mount in the same manner and the body of the 700 Power Drive to change orientation in the support bracket.

The present subject matter support systems also feature releasable engagement provisions between the lower frame portion that contacts a work surface or floor, and the mast assembly. A wide array of different types and assemblies of releasable engagement provisions can be used. For example, in many versions of the present subject matter, the lower frame portion includes a receiver tube that is sized and shaped to receive and engage an end of a support member of the mast assembly. Each of the receiver tube and the support member include one or more apertures which can be aligned upon inserting the support member within the receiver tube. Upon aperture alignment, a pin or other fastening component is inserted into the aligned apertures, thereby securing the mast assembly to the lower frame portion. The lower frame portion and the mast assembly can be released, disengaged, and separated from each other by removing the pin from the aligned apertures.

In certain embodiments, the mounting provisions on the mast include a U-shaped bracket that is affixed to the mast and is sized to receive and support a power drive or other tool(s). The U-shaped bracket enables the power drive to be easily removed and separated from the mast assembly. As previously noted, the U-shaped bracket configuration enables a variety of geared threaders to be used without modification or adjustment. The geared threader can be supported in the same manner and the orientation of the power drive in the bracket can be changed. It will be appreciated that the U-shaped bracket could be provided in a variety of different forms and configurations. For example, the bracket could be in the form of a slot in the mast and include a post or other member extending from the power drive. In particular embodiments, the mounting provisions also include at least one fastening member and particularly two (2) bolts, extending from the mast, to which a geared threader or other tool(s) is affixed.

During use, e.g., forming threads on an end of a pipe inserted into the threader, the support system and associated components allow the pipe to move and particularly rotate about the pipe's longitudinal axis.

In certain embodiments, the lower frame portion of the support system can include wheels to promote transportability. In certain versions, a "dolly" configuration can be utilized in which the support system includes wheels along a lower region which support the system upon tilting or pivoting the system so as to rest upon that lower region with wheels.

Although the present subject matter support systems are generally described herein for use with handheld powered drives and geared threaders, it will be appreciated that the present subject matter support systems can also be used in conjunction with a wide array of other tools and devices. For example, in certain applications the support systems can be used in association with pipe cutters as described in greater detail herein. In addition, the support systems of the present subject matter can be used with roll groovers such as those available from RIDGID® and other manufacturers, in combination with a handheld powered drive. It is further contemplated that other tools such as cut groovers as known in the art, could be employed such as for example VG Vic-Groover Cut Grooving Tool available from Victaulic. Moreover, it will also be appreciated that many of the tools or devices noted herein may be used for one or more applications besides their primary application. For example, the noted RIDGID® 141 and/or 161 geared threaders can in certain configurations be used as bevellers. The present subject matter support systems can be used in association with an assortment of tools and devices, and used in a variety of uses and applications and is not limited to the particular embodiments described herein.

Additional details of power drives, threaders, and the support systems are as follows.

Power Drives

The support systems of the present subject matter are adapted for use with a wide array of power drives. In many embodiments, the support system is configured for use with a portable handheld power drive. Generally, such power drives include (i) a body or housing, (ii) a head at which is provided a powered rotary member, (iii) one or more handles extending from or incorporated in the body, and (iv) a motor or other component which provides rotary power to the rotary member at the head. However, it will be appreciated that the present subject matter is not limited to use with handheld power drives. It is contemplated that other power drives or threading machines could be used, either mounted to the mast such as a RIDGID® Model 300 Power Drive, or using other configurations such as a RIDGID® Model 840A drive shaft.

Nonlimiting examples of portable handheld power drives that can be used with the various support systems of the present subject matter include RIDGID® Models 700, 690, 600 Power Drive available from Ridge Tool; Models 700PD, 701PD, and 601PD Power Drive available from Reed Manufacturing; Phenix III Portable Electric Threader and Phenix Mini Portable Electric Threading Machine available from Virax; Portable Electric Pipe Threading Machine available from Neiko Tools; and CUMI Pipe Threader Models CPT 038 and CPT 050 available from Tolexo. Typically, the motor is an electric motor however, other rotary power providing components can be used such as combustion engines and components using pressurized air or fluids. Typical portable handheld power drives weigh from about 10 to about 40 pounds with many weighing from 18 to 30 pounds. Typical portable handheld power drives include a handle or extension of the body or housing which projects in an opposite direction from the head. A typical maximum length of most portable handheld power drives ranges from about 18 inches to about 38 inches, with many power drives having an overall length of from 20 inches to 33 inches.

Threaders

The support systems of the present subject matter are adapted for use with a wide array of threaders and particularly geared threaders as described herein. Generally, typical geared threaders include (i) a drive shaft to which the powered rotary member of a power drive is engaged or coupled, (ii) a housing, (iii) a gear assembly that includes a pinion gear coupled to the draft shaft which is engaged with an annular gear which rotatably drives a workpiece to be threaded, and (iv) one or more thread forming dies.

During use of most if not all geared threaders, an operator inserts an end of a workpiece into the geared threader and the threader is clamped or affixed to the workpiece typically by one or more workholders or jaws associated with the threader that engage the workpiece. A source of rotary power is then coupled to the drive shaft of the geared threader. Upon powered rotation of the geared threader drive shaft, the annular gear is rotated and dies in the threader form threads in the workpiece.

If the workpiece is clamped or otherwise secured in a stationary position, the geared threader orbits around the longitudinal axis of the pipe during threading. If rotation of the pipe is permitted, the pipe may instead rotate about its longitudinal axis during threading.

In many embodiments of the present subject matter, the geared threader is affixed or otherwise secured to the support system, and thus rotation of the pipe occurs during threading.

Another aspect of the present subject matter is that a geared threader can be used to drive the pipe for cutting and reacting the torque from the pipe cutter. This ability is not possible with currently known geared threaders.

Support Systems

As previously noted, in many embodiments, the present subject matter provides various support systems that enable or permit rotational movement of a workpiece about its longitudinal axis during a thread forming operation, and/or internalize all reaction torque generated during the thread forming operation.

In particular embodiments, the support systems of the present subject matter generally comprise (i) a lower frame portion for contacting a work surface or floor, (ii) a mast assembly, (iii) releasable engagement provisions between the lower frame portion and the mast assembly, and (iv) mounting provisions for supporting one or more tools such as a handheld power drive and a geared threader. In certain embodiments, the support systems also comprise one or more docking members for countering reaction torque such as may be generated during a thread forming operation.

The lower frame portion can take a wide array of different forms and configurations. In many embodiments, the lower frame portion includes a pair of horizontally extending members spaced apart from one another. The reference to "horizontal" is with regard to the support system during use in its stand alone mode and the pair of members contacting the ground or floor. In particular embodiments, the pair of members are oriented parallel to each other. The lower portion typically also includes one or more transverse members extending upward from the pair of horizontal members. It will be appreciated that the present subject matter includes lower frame portions having horizontal ground-contacting members that are not parallel to one another and/or members extending upward from the ground-contacting members which are not transverse to the ground-contacting members.

The mast assembly generally includes a primary support having a proximal end and an opposite distal end. During use of the system in a stand alone mode, the proximal end is releasably engaged with and thus near or adjacent to the transverse member(s) of the lower frame portion. The distal end of the mast primary support is typically cantilevered and extends outward from the transverse member(s) of the lower frame portion.

The releasable engagement provisions serve to releasably engage the mast assembly with the lower frame portion. The releasable engagement provisions are in many embodiments, associated with (i) the proximal end of the primary support of the mast assembly and (ii) an end region of the transverse member(s) of the lower frame portion, in which the end region is spaced from the pair of spaced apart members. As previously noted, the releasable engagement provisions can include a receiver tube provided with the lower frame portion and the proximal end of the primary support of the mast assembly configured to be received in the receiver tube. The receiver tube is sized and shaped to correspond to receiver tubes used in vehicle hitch receivers. Thus, the proximal end of the primary support of the mast assembly can also be releasably engaged in a receiver tube of many vehicle hitch receivers when using the support system in its vehicle hitch mode.

The mounting provisions can include one or more brackets such as a U-shaped bracket, support provisions, fastening member(s) such as hitch pins, threaded fasteners, and/or bolts, and combinations thereof. Nearly any mounting structure or component can be used, the selection of which typically depends upon the tool(s) to be supported.

The support systems of the present subject matter internalize all reaction torque generated during a threading operation such as for example when using a portable handheld power drive and a geared threader both of which being supported and/or retained in the support system. The term "internalize all reaction torque" refers to a state of the support system, power drive, and geared threader that is achieved during a threading operation such that the support system can be free standing and free of any external supports, tie downs, anchors or the like which would otherwise be required for use during threading operations using conventional assemblies.

The present subject matter also provides various methods of forming threads in a workpiece using a handheld power drive. In one method, a method of supporting at least one tool is provided which comprises providing a tool support system such as described herein. The tool support system includes (i) a lower frame portion for contacting a work surface or floor, (ii) a mast assembly, (iii) releasable engagement provisions between the lower frame portion and the mast assembly, and (iv) mounting provisions on the mast assembly. The method also comprises placing the tool support system in a stand alone mode by engaging the mast assembly with the lower frame portion by use of the releasable engagement provisions between the lower portion and the mast assembly. And, the method also comprises securing a tool to the mounting provisions on the mast assembly to thereby support the tool. In many applications it is more convenient to secure the tool to the mast and then engage the mast with the lower frame portion. In certain embodiments, engaging the mast assembly with the lower frame portion is performed by aligning apertures defined in each of the mast assembly and the lower frame portion and inserting a pin through the aligned apertures.

In another aspect, a method of supporting at least one tool is provided which comprises providing a tool support system such as described herein. The tool support system includes (i) a lower frame portion for contacting a work surface or floor, (ii) a mast assembly, (iii) releasable engagement provisions between the lower frame portion and the mast assembly, and (iv) mounting provisions on the mast assembly. The method also comprises providing a vehicle hitch receiver. The method additionally comprises placing the tool support system in a vehicle hitch mode by disengaging and separating the mast assembly from the lower frame portion. The method also comprises engaging the mast assembly with the vehicle hitch receiver. And, the method further comprises securing a tool to the mounting provisions on the mast assembly to thereby support the tool. In many applications, it is more convenient to secure the tool to the mast and then engage the mast with the vehicle hitch receiver. In certain embodiments, engaging the mast assembly with the vehicle hitch receiver is performed by aligning apertures defined in each of the mast assembly and the vehicle hitch receiver and inserting a pin through the aligned apertures.

Figure 9:
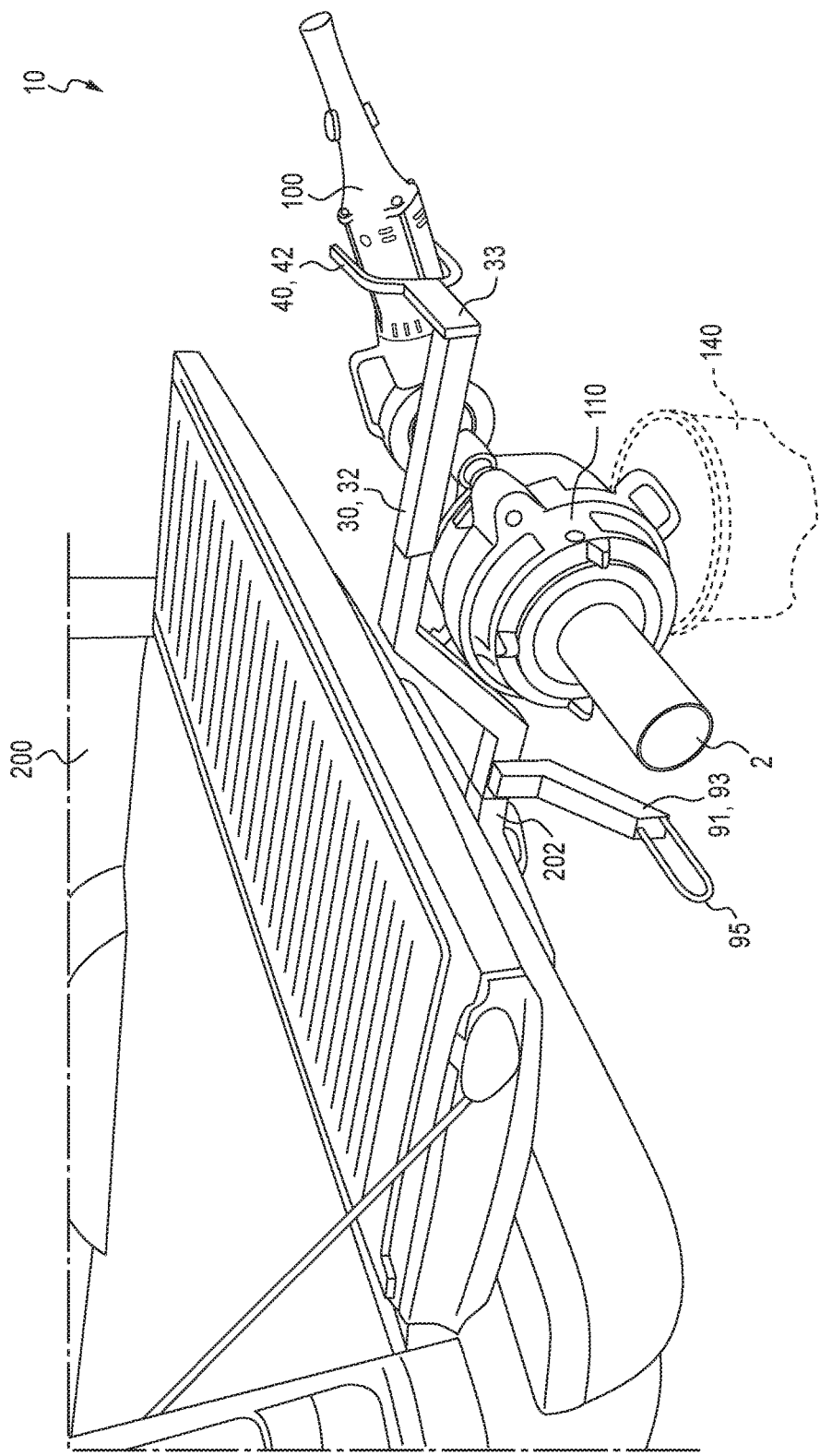
Figure 10:
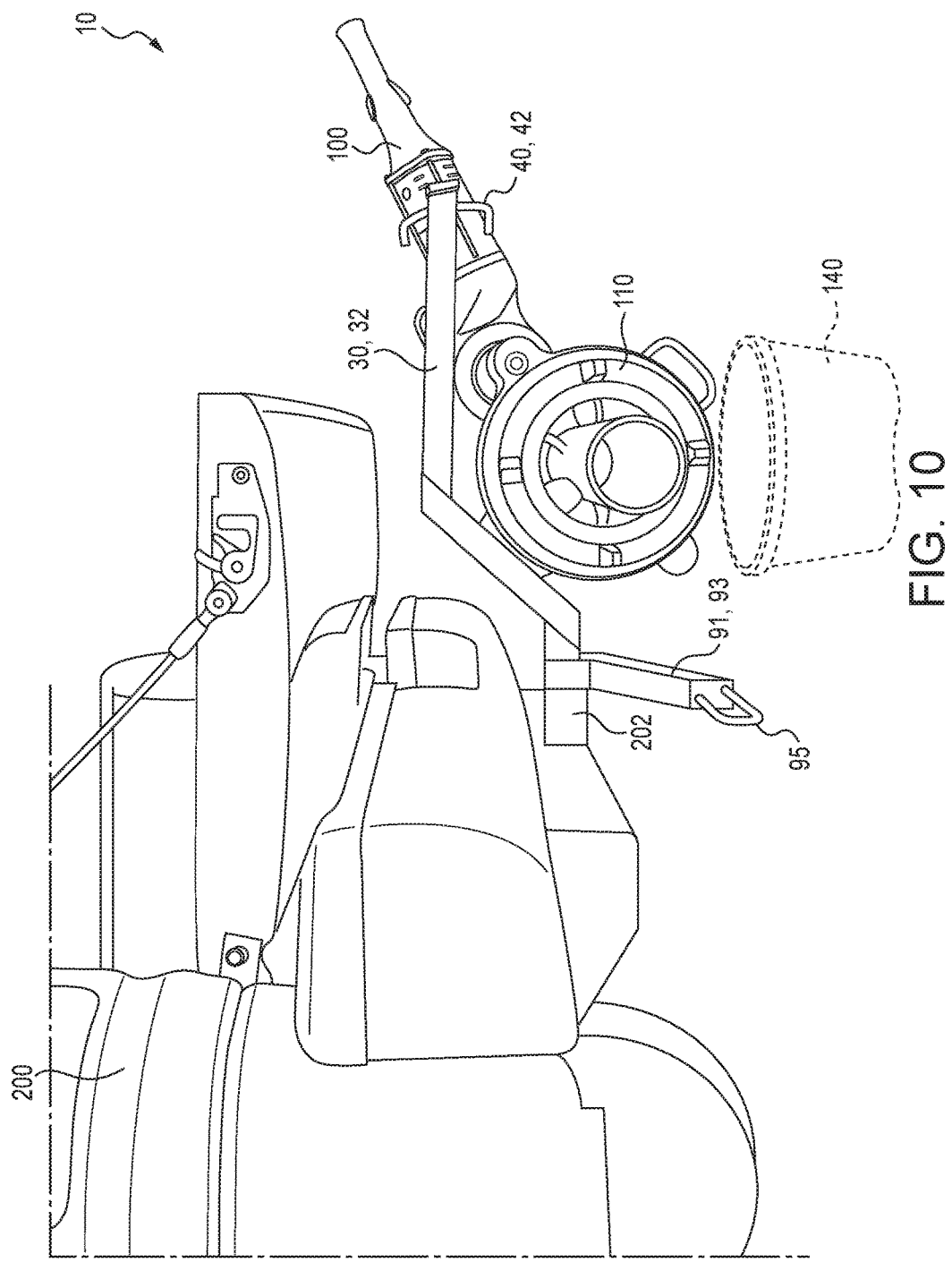

FIGS. 1-11 illustrate an embodiment of a tool support system 10 in accordance with the present subject matter. FIGS. 2-8 show the system 10 during use with a typical handheld power drive 100, an associated geared threader 110, and pipe 2 or other workpiece while the system 10 is in a stand alone mode. FIGS. 9-11 illustrate the system 10 during use with the power drive 100, the threader 110, and pipe 2 while the system 10 is in a vehicle hitch mode.

The support system 10 comprises a lower frame portion 20 releasably engaged with a mast assembly 30. The lower frame portion 20 and the mast assembly 30 are releasably secured to each other by releasable engagement provisions 50 which are shown in the form of a receiver tube 60.

The lower frame portion 20 includes one or more ground-contacting members 22. As previously noted, in many embodiments the members 22 are parallel to each other and generally horizontal upon placement on the ground or floor. The lower frame portion 20 also includes one or more upwardly extending members 24, which are engaged with and extend from the ground-contacting members 22. As previously noted, in many embodiments the member(s) 24 is oriented transverse to the ground-contacting members 22. The present subject matter includes provisions to allow users to level or otherwise adjust the height or orientation of the lower frame.

The mast assembly 30 includes a primary support member 32 having a proximal end 31 and an opposite distal end 33. The primary support member 32 additionally defines a plurality of apertures 34 near or along the proximal end 31 (not shown) for receiving a pin 70 or other fastening member for releasable engagement in the receiver tube 60.

The mast assembly 30 can additionally include mounting provisions 40 on the primary support member 32, for supporting a tool such as a handheld power drive 100. The mounting provisions 40 are depicted in FIGS. 2-4, 6, and 8-11 as a U-shaped bracket 42.

The releasable engagement provisions 50 between the lower frame portion 20 and the mast assembly 30 are depicted in FIGS. 1-8 as including a receiver tube 60 and the proximal end 31 of the mast support member 32. The receiver tube 60 is engaged to an upper end of the transverse member 24 of the lower frame portion 20. The releasable engagement provisions 50 can additionally include a pin 70 configured to be inserted within one or more aperture(s) 62 defined in the receiver tube 60 and one or more aperture(s) 34 defined in the mast support member 32.

The tool support system 10 may also comprise coupling provisions 80 on the mast for securely supporting and engaging a tool such as the geared threader 110. A wide array of configurations and assemblies can be used for the coupling provisions 80 as these are typically governed by the tool and type of mounting for the tool, e.g., geared threader. In many embodiments, the coupling provisions enable a variety of different sizes of geared threaders to be mounted to the mast, without adjustment. For example, a clamping plate and associated hardware can be used to affix a geared threader to the mast. Specifically, an embodiment of coupling provisions 80 is shown in FIGS. 3, 5, 7,8, and 11 in which a removable clamping plate 81 (best shown in FIGS. 3, 7, and 11) is selectively engaged with the mast assembly 30. The clamping plate enables affixment of a variety of different threaders and secures the threader to the mast assembly typically by inserting outwardly extending threaded members of the mast through a handle of the geared threader and then threadedly engaging the members with threaded fasteners that extend through apertures in the clamping plate. Upon tightening the threaded fasteners with the threaded members of the mast, the geared threader is affixed to the mast. It will be appreciated that the present subject matter includes an array of other engagement techniques and configurations for coupling a geared threader or other device to the mast.

The tool support system 10 can also include one or more reaction torque docking member(s) 90. The docking member 90 serves to counter reaction torque generated during a typical thread forming operation. As shown in FIGS. 2-5, the docking member 90 in this embodiment of the present subject matter is in the form of a bracket 92 defining a receiving region 94 that is sized and shaped to receive a torque transmitting member such as a handle 122 of a component or tool such as a pipe cutter 120 tightened about a workpiece or pipe 2. The docking member 90 can be secured to any portion of the lower frame portion 20 and/or the mast assembly 30. The docking member 90 may be selectively positionable such as slidably positionable in the direction of arrows A and B in FIG. 2 for example. In the embodiment depicted in FIGS. 1-5, the docking member 90 is affixed to a region of a ground-contacting member 22 or other lower frame portion. In the embodiment depicted in FIGS. 6-9, a second docking member 91 is affixed to the mast assembly 30. The second docking member 91 can be in the form of a bracket 93 and define a receiving region 95 for receiving a torque transmitting member such as the handle 122 of a component or tool such as the pipe cutter 120. Affixment of the docking member 90 to the mast assembly 30 enables the support system 10 to counter reaction torque when the support system 10 is in a vehicle hitch mode.

A variety of modifications and alternate constructions could be employed for the support systems described herein. For example, a pin and clip assembly such as used for item 70, could be utilized for engaging the U-shaped bracket 40, and for affixing the cutter reaction arm 91, 93, 95.

Figure 2:
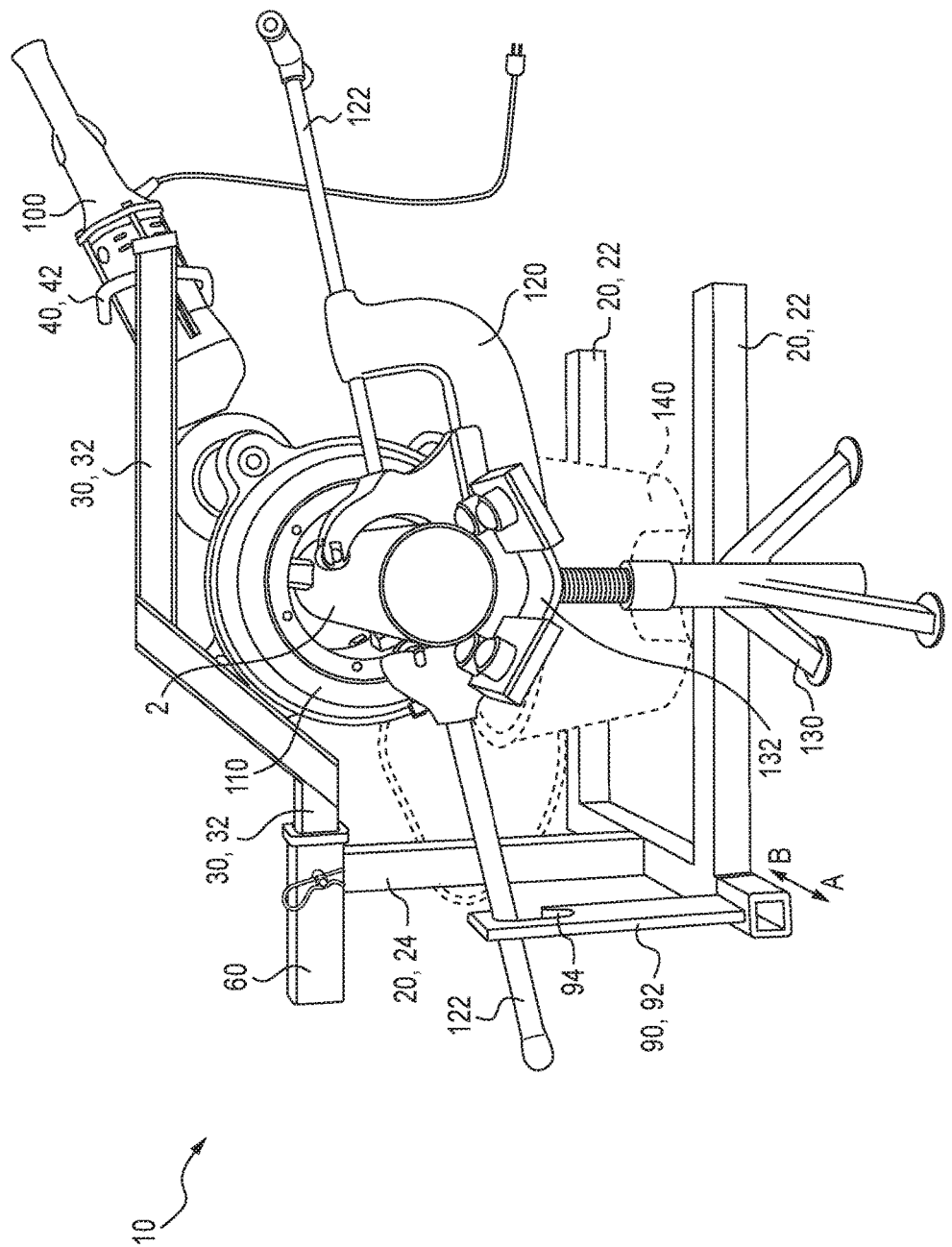
FIG. 2 illustrates the tool support system depicted in FIG. 1 in a stand alone mode and during use with typical thread forming tools and a pipe.
Figure 3:
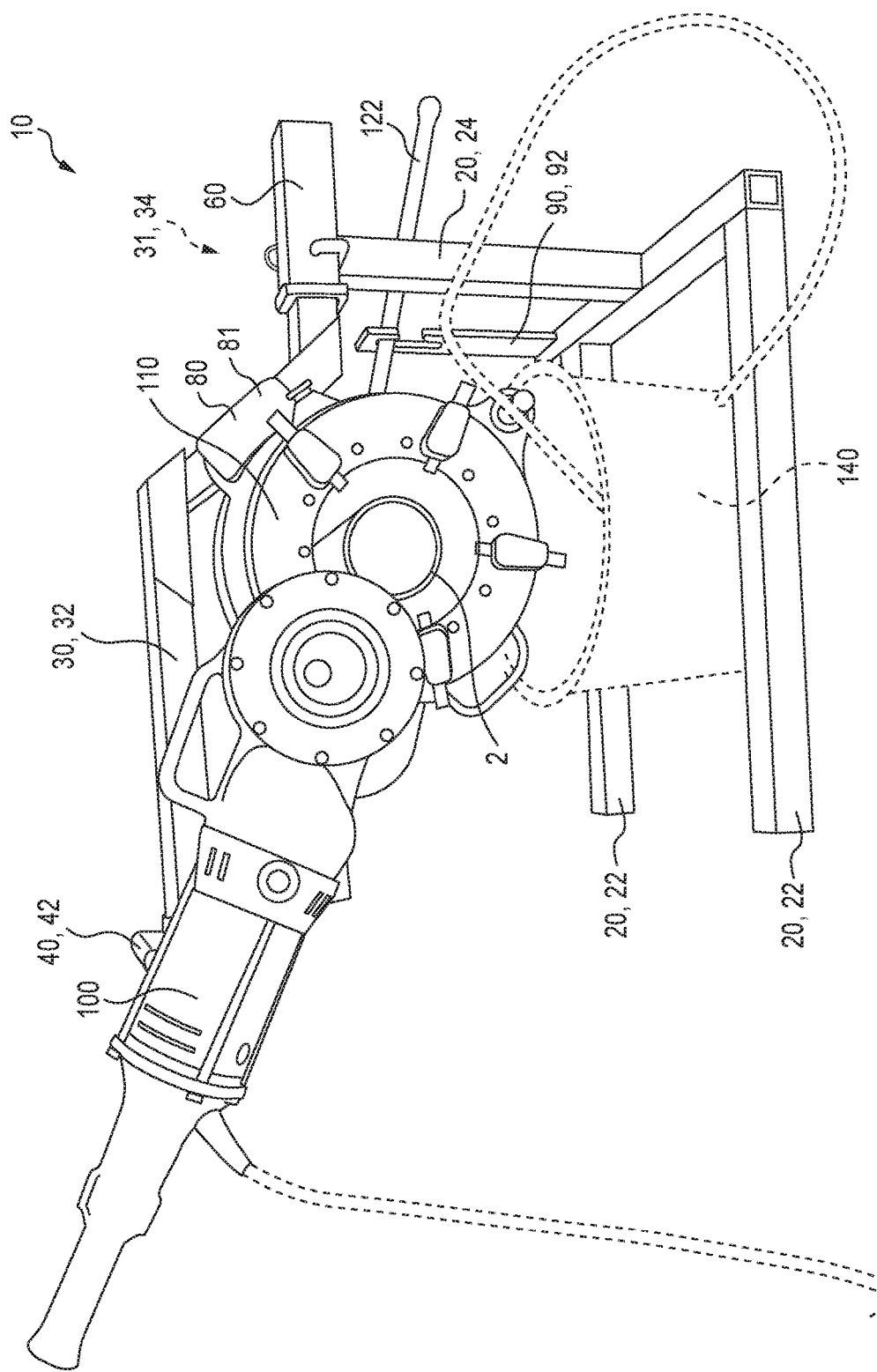
FIG. 3 is a view illustrating a second side opposite from the first side of the tool support system shown in FIGS. 1-2.
Figure 4:
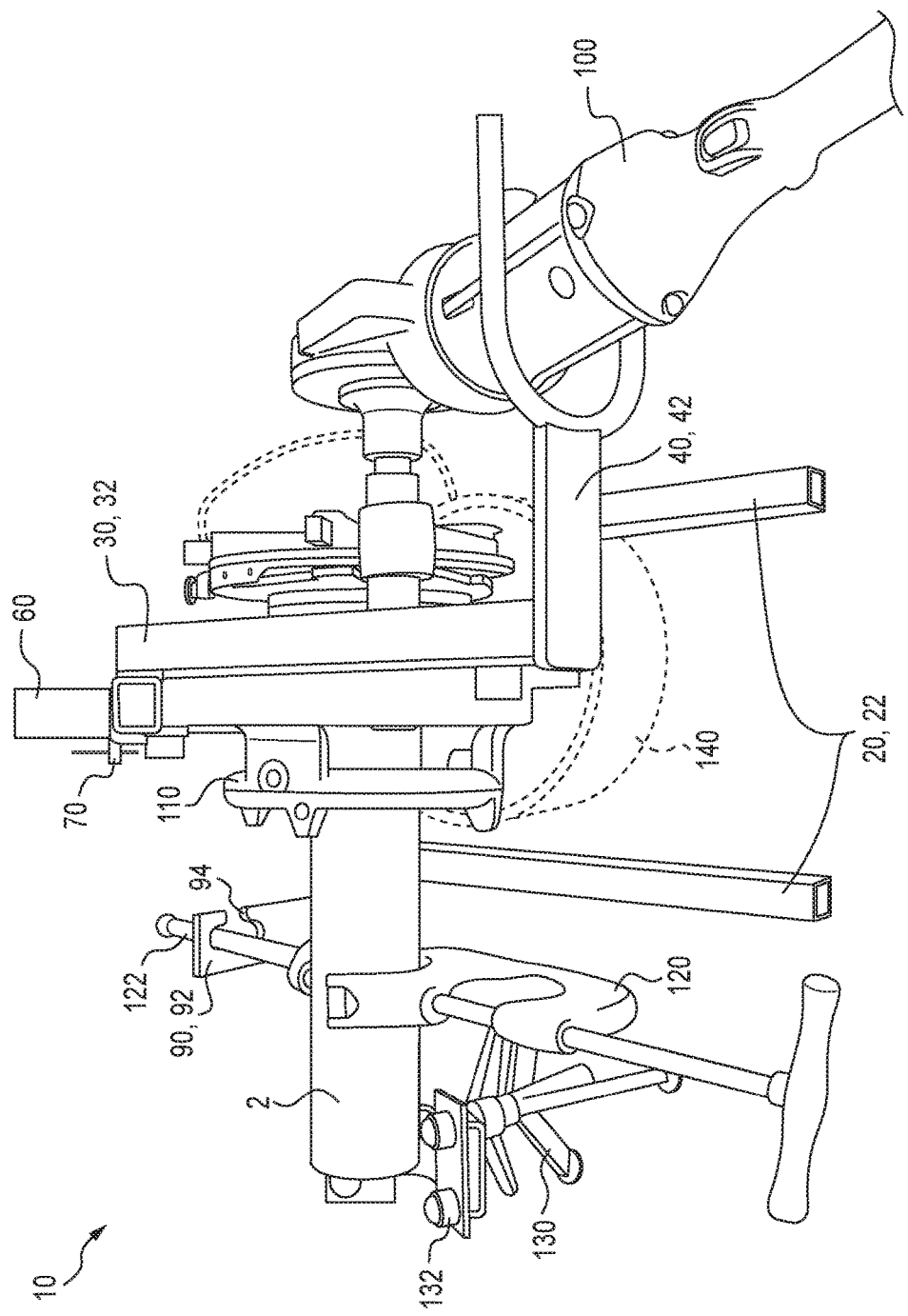
FIG. 4 is a another view of the tool support system shown in FIGS. 1-3.
Figure 5:
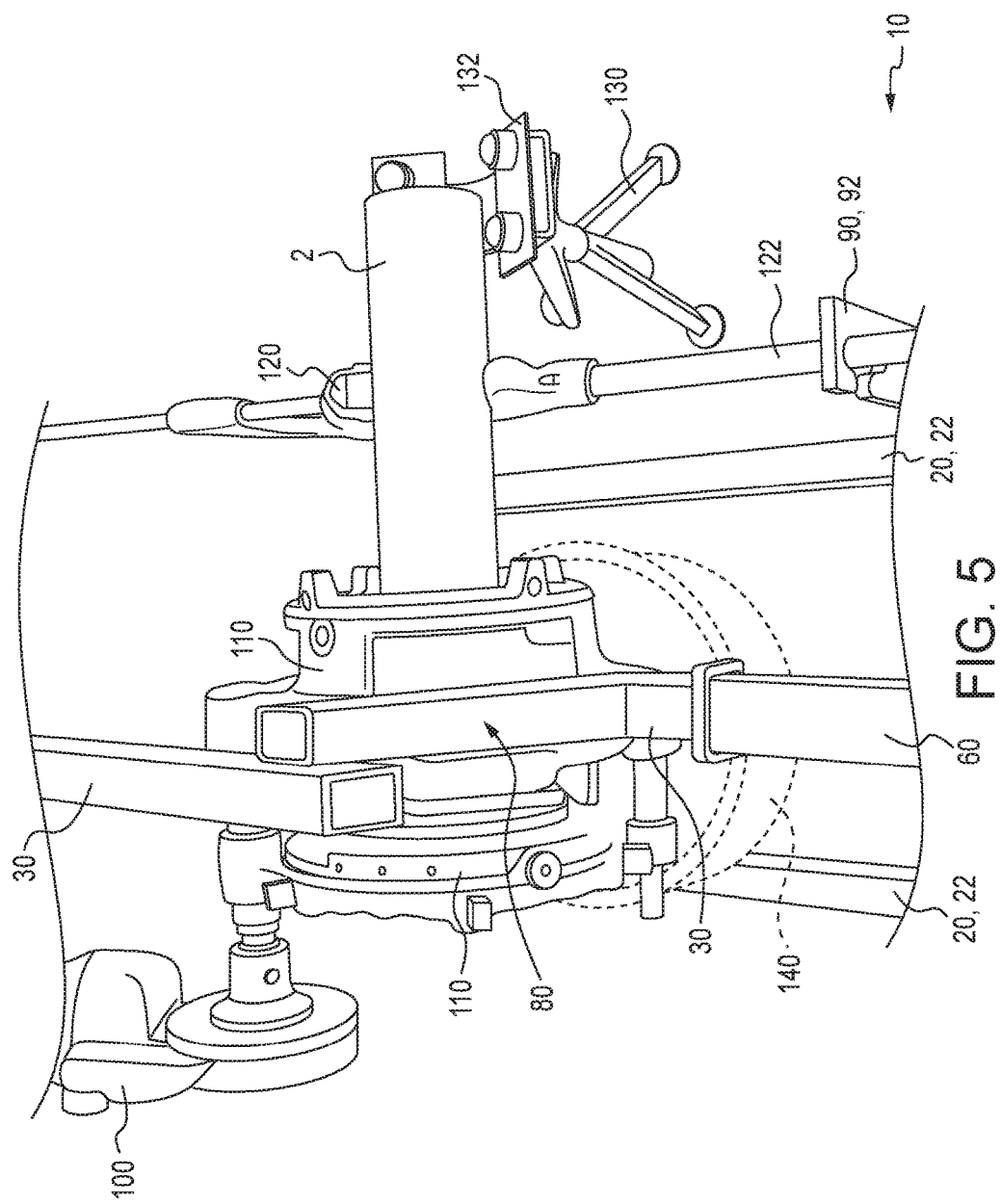
FIG. 5 is a detailed view of a portion of the top of the tool support system shown in FIGS. 1-4.
Figure 6:
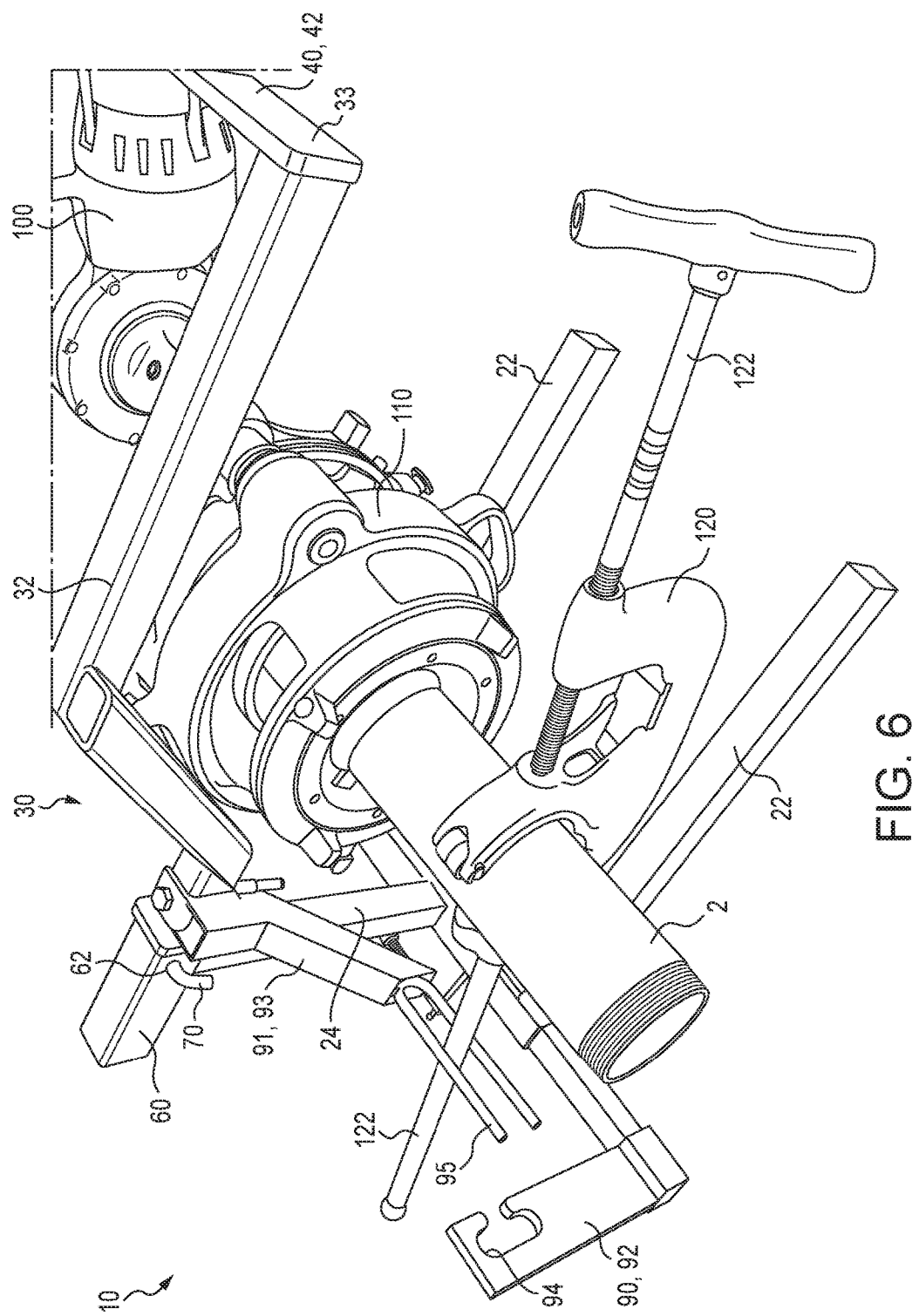
FIGS. 6-8 illustrate the tool support system of FIGS. 1-5 further including a docking member affixed to a mast assembly in accordance with the present subject matter.
Figure 7:
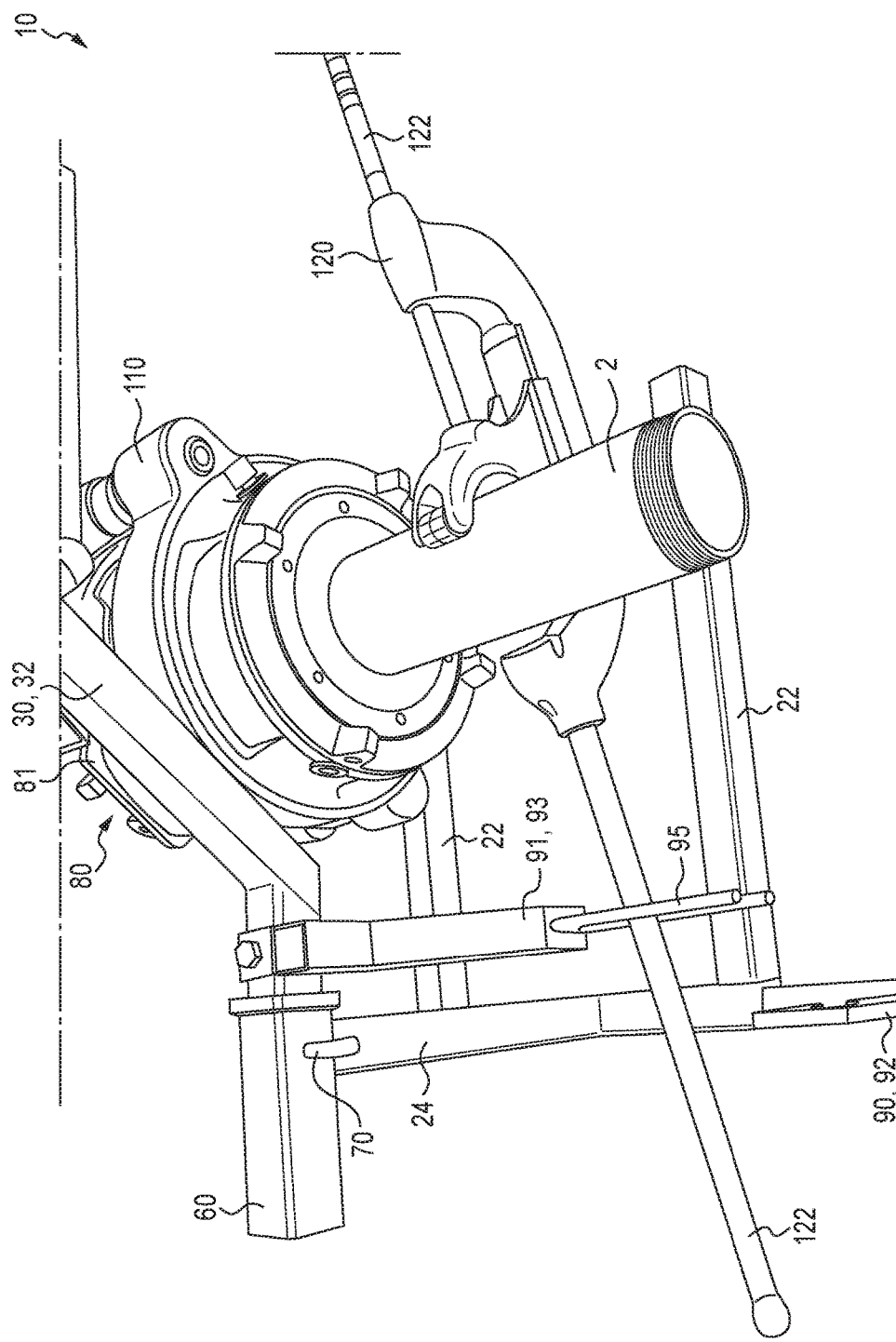
Figure 8:
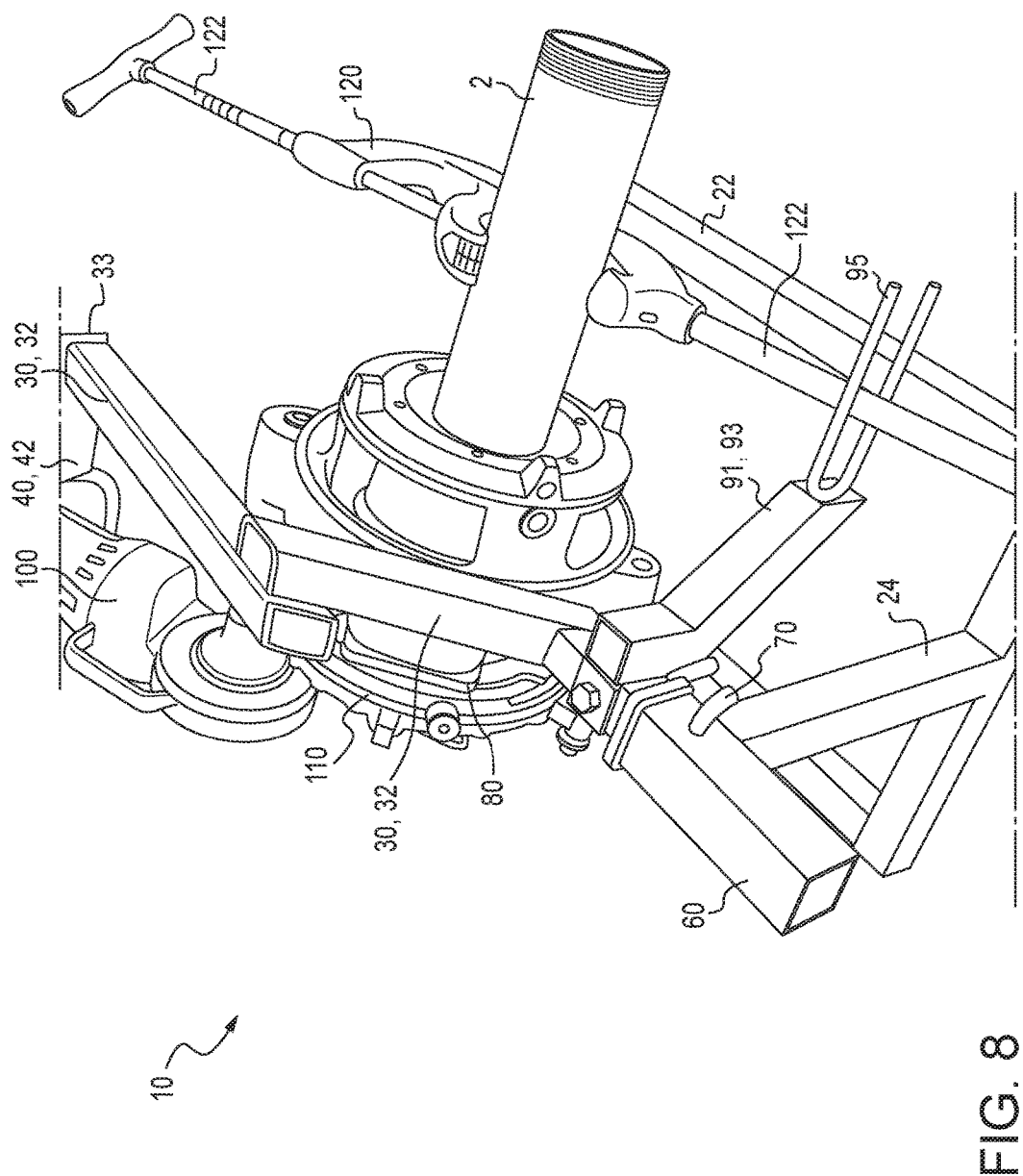

During use of the tool support system 10, for example in forming threads on the pipe 2, it may be useful to support an end or region of the pipe 2 using one or more pipe stands such as a pipe stand 130 configured with a ball transfer head 132 such as shown in FIGS. 2, 4, and 5. A wide variety of pipe stands can be used such as for example those available under the designation RIDGID® Pipe Stands. In certain uses or applications, the pipe is positioned low enough so that low clearance pipe stands can be used.

During use of the tool support system 10, for example in forming threads on the pipe 2, it may be useful to position a container or receptacle 140 such as for example a RIDGID® Model 418 Oiler, under the thread forming location to catch any thread cutter oils or other lubricants along with debris and metal shavings that are generated during thread forming. In many embodiments of the tool support system, the ground-contacting members 22 are spaced apart from one another a distance that is greater than the span or diameter of the container 140. In addition, the container can be centered under the travel of the die head. This enables the container 140 to be positioned between the members 22 and/or on the ground or floor rather than being placed on one or both of the members 22.

FIGS. 9-11 illustrate the tool support system 10 in a vehicle hitch mode and during use with the handheld power drive 100 and geared threader 110 in forming threads on pipe 2. In the vehicle hitch mode, the mast assembly 30 is separated from the lower frame portion 20 (not shown in FIGS. 9-11). The proximal end 31 of the mast assembly is engaged in a receiver tube 202 affixed or otherwise mounted on a vehicle 200. Although FIGS. 9-11 depict a vehicle hitch receiver mounted under a vehicle rear bumper, the present subject matter can be used with vehicle hitch receivers affixed or otherwise secured to other regions of a vehicle such as along a front or side region of a vehicle. It is also contemplated that the vehicle hitch receiver may be mounted on vehicles besides trucks such as tractors, various all-terrain vehicles, "Bobcats," and other utility vehicles. Furthermore, the vehicle hitch receiver could be mounted on trailers or other assemblies.

In certain applications, the present subject matter support system can be used with a geared threader that serves to rotate a workpiece such as pipe, and a pipe cutter to provide powered cutting. For example, the support system can support a geared threader such as previously described herein and a RIDGID® Pipe Cutter such as Models 4-S or 6-S. The geared threader is operated to rotate the pipe about its longitudinal axis, using a powered drive for example. The pipe cutter is engaged with the pipe and optionally supported and/or retained in a desired position by one or more brackets or docking members. This arrangement is depicted in FIG. 4 for example in which the geared threader 110 rotates pipe 2, and the component 120 is in the form of a pipe cutter. Powered cutting of the pipe can be performed by rotating the pipe about its longitudinal axis via the geared threader 110 and radially displacing a cutter wheel (not shown) in the pipe cutter. Thus, the support system of the present subject matter enables powered cutting of pipes or other workpieces using known handheld manually displaceable pipe cutters and particularly those with at least one cutter wheel.

More specifically, in this aspect of the present subject matter, a method of powered cutting of a pipe can be performed as follows. A tool support system as described herein is provided. A geared threader is secured to the mounting provisions on the mast assembly to thereby support the geared threader. A pipe to be cut is then positioned in the geared threader. A manually displaceable pipe cutter is provided. Typically, such cutters include one or more cutter wheels and an outwardly extending handle or member. The pipe cutter is then engaged with the pipe. The pipe is then rotated using the geared threader while manually displacing the cutting wheel into the pipe. In certain embodiments, if the support system includes a docking member, the handle of the pipe cutter is engaged with the docking member. In certain uses, the handle could be contacted with other regions of the support system.

The present subject matter support systems can be provided in various configurations. Although in most embodiments it is contemplated that the support system is provided in at least two components, i.e., a lower frame portion and a mast assembly, it will be understood that the support systems can be provided in a disassembled configuration to promote transport, shipping, and/or storage. For example, either or both of the lower frame portion and/or the mast assembly may be readily disassembled and provided in a form more convenient for transport, shipping, and/or storage.

EXAMPLE

An example of powered cutting of a pipe using a RIDGID® 700 Power Drive, a 141 or 161 geared threader, and a 4-S or 6-S cutter, and the tool support system having a docking member is as follows.

Using the tool support system in either stand alone mode or vehicle hitch mode, insert the handle of the pipe cutter into the receiving region of the docking member. The cutter can be momentarily placed upon the ground or floor.

As for the geared threader, fully retract the dies. Pull the cam plate knobs out and rotate the cam plate towards the "CD" mark on the top of the head of the dies.

Pipe stands can be used to support pipe by placing the pipe stands in line with the workholder of the geared threader and/or pipe.

Position the region of pipe to be cut in line with the cutting region of the pipe cutter. If passing the pipe through the die head, care is taken to ensure that the pipe does not contact or strike the dies.

The geared threader workholder is then tightened about the pipe. Confirm that the pipe is centered and no interference exists.

The pipe cutter is then opened and the cutter wheel is aligned with the desired cut location. The pipe cutter feed screw (or other mechanism) is then tightened to bring the cutter wheel in contact with the pipe while keeping the cutter wheel aligned with the mark on the pipe.

The power drive is then actuated to begin cutting. Cutting can be performed in either direction. When cutting in conjunction with forming threads, cutting of the pipe may be performed while returning the die head to the thread start point.

After one full rotation of the pipe, release the power drive switch and tighten the feed screw.

Periodic actuation of the power drive and tightening of the pipe cutter is repeated until the pipe is cut.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A tool support system comprising:
   a lower frame portion for contacting a work surface or floor;
   a mast assembly;
   releasable engagement provisions between the lower frame portion and the mast assembly;
   mounting provisions on the mast assembly for supporting one or more tools;
   a power tool supported by a first mounting provision on the mast assembly;
   a threader supported by a second mounting provision on the mast assembly;
   wherein the support system is configurable between (i) a stand alone mode in which the mast assembly is engaged with the lower frame portion and (ii) a vehicle hitch mode in which the mast assembly is disengaged and separate from the lower frame portion;
   wherein upon the system supporting the power tool secured to the mast by the mounting provisions and the threader secured to the mast by the mounting provisions in a thread forming application, the support system internalizes all reaction torque from the power tool and the threader.

2. The tool support system of claim 1 wherein the lower frame portion includes a pair of horizontally extending members spaced apart from each other.

3. The tool support system of claim 2 wherein the pair of members are oriented parallel to each other.

4. The tool support system of claim 1 wherein the releasable engagement provisions include a receiver tube secured to the lower portion and an end of the mast assembly which is sized and shaped to be inserted within and received by the receiver tube.

5. The tool support system of claim 4 wherein the receiver tube defines at least one aperture and the end of the mast assembly defines at least one aperture and the releasable engagement provisions further include a pin sized to be inserted into the apertures defined in the receiver tube and the end of the mast assembly.

6. The tool support system of claim 1 further comprising a docking member affixed to the lower frame portion, the docking member defining a receiving region sized and shaped to receive a handle of a component through which reaction torque is transmitted.

7. The tool support system of claim 1 wherein upon configuring the support system in the stand alone mode, the support system is free standing and free of external anchoring provisions.

8. The tool support system of claim 1 wherein the mounting provisions enable different sizes of threaders to be mounted to the mast assembly.

9. A tool support system comprising:
   a lower frame portion for contacting a work surface or floor, the lower frame portion including an upwardly extending member and a receiver tube engaged to an upper end of the upwardly extending member, the receiver tube defining a plurality of apertures;
   a mast assembly having a primary support member defining a plurality of apertures near a proximal end of the primary support member;
   a removable pin configured to be inserted within an aperture defined in the primary support member and an aperture defined in the receiver tube;
   mounting provisions on the mast assembly for supporting one or more tools, the mounting provisions including a first mounting provision and a second mounting provision;
   a power tool supported by the first mounting provision on the mast assembly;
   a threader supported by the second mounting provision on the mast assembly;

wherein the support system is configurable between (i) a stand alone mode in which the mast assembly is engaged with the lower frame portion by inserting the primary support member in the receiver tube and inserting the pin in an aperture defined in the primary support member and an aperture defined in the receiver tube, and (ii) a vehicle hitch mode in which the mast assembly is disengaged and separated from the lower frame portion by removal of the pin, and engagement between the primary support member of the mast assembly and a receiver tube of a vehicle hitch.

10. The tool support system of claim 9 wherein the lower frame portion includes a pair of horizontally extending members spaced apart from each other.

11. The tool support system of claim 10 wherein the pair of members are oriented parallel to each other.

12. The tool support system of claim 9 wherein upon the system supporting the power tool secured to the mast by the first mounting provisions and the threader secured to the mast by the second mounting provisions in a thread forming application, the support system internalizes all reaction torque from the power tool and the threader.

13. The tool support system of claim 12 further comprising a docking member affixed to the lower frame portion, the docking member defining a receiving region sized and shaped to receive a handle of a component through which reaction torque is transmitted during the thread forming operation.

14. The tool support system of claim 9 wherein upon configuring the support system in the stand alone mode, the support system is free standing and free of external anchoring provisions.

\* \* \* \* \*